United States Patent
Uh

(10) Patent No.: US 8,852,795 B2
(45) Date of Patent: Oct. 7, 2014

(54) SECONDARY BATTERY

(75) Inventor: Hwail Uh, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 1794 days.

(21) Appl. No.: 11/876,028

(22) Filed: Oct. 22, 2007

(65) Prior Publication Data

US 2008/0107962 A1    May 8, 2008

(30) Foreign Application Priority Data

Oct. 24, 2006  (KR) .......................... 10-2006-0103368

(51) Int. Cl.
*H01M 2/04* (2006.01)
*H01M 10/42* (2006.01)
*H01M 10/0525* (2010.01)

(52) U.S. Cl.
CPC .......... *H01M 2/0404* (2013.01); *H01M 2/0473* (2013.01); *H01M 10/4257* (2013.01); *H01M 10/0525* (2013.01); *Y02E 60/12* (2013.01)
USPC .......................................... 429/175; 429/180

(58) Field of Classification Search
CPC .............................. H01M 2/04; H01M 2/0473
See application file for complete search history.

(56) References Cited

U.S. PATENT DOCUMENTS

2003/0180582 A1 * 9/2003 Masumoto et al. ................ 429/7
2005/0089753 A1 * 4/2005 Yoon .............................. 429/180

FOREIGN PATENT DOCUMENTS

KR    2002-70586        9/2002
KR    20030066243    *  8/2003    .............. H01M 2/08

OTHER PUBLICATIONS

English Abstract of KR20030066243, EPO, printed Feb. 12, 2011.*

* cited by examiner

*Primary Examiner* — Maria J Laios
(74) *Attorney, Agent, or Firm* — Knobbe Martens Olson & Bear LLP

(57) ABSTRACT

A secondary battery including: a bare cell including an electrode assembly, a can to receive the electrode assembly, and a cap assembly attached to an opening of the top of the can; a protection circuit board electrically connected to the bare cell, and a molded resin disposed between the cap assembly and the protection circuit board. The cap assembly includes a cap plate attached to the top of the can and having a through-hole, an electrode terminal extending through the through-hole; and a gasket disposed around the electrode terminal. A portion of the molded resin is disposed in a gap between the electrode terminal and an upper surface of the cap plate.

16 Claims, 2 Drawing Sheets

SECONDARY BATTERY

CROSS-REFERENCE TO RELATED APPLICATION

This application the benefit of Korean Application No. 2006-103368, filed Oct. 24, 2006, in the Korean Intellectual Property Office, the disclosure of which is incorporated herein by reference.

BACKGROUND OF THE INVENTION

1. Field of the Invention

Aspects of the present invention relate a secondary battery that can improve an attachment between a molded resin part and a cap assembly.

2. Description of the Related Art

Generally, a secondary battery is a battery capable of being charged and discharged several times. Secondary batteries have been used for high-tech electronics, such as, cellular phones, notebook computers, camcorders, and the like.

An operating voltage of a lithium secondary battery is 3.6 volts, which is three times larger than that of a nickel-cadmium (Ni/Cd) battery or a nickel-hydrogen battery (Ni/H2) which are also used to power electronic equipment. Thus, the high energy density of a lithium secondary battery has led to its widespread adoption.

A lithium secondary battery generally uses a lithium-based oxide as a cathode active material and a carbon material as an anode active material. Lithium secondary batteries have been manufactured in various shapes, such as, a cylindrical shape, a polygonal shape, a pouch shape, and others. A polygon-shaped secondary battery comprises a bare cell, a protection circuit board, and a molded resin part.

The bare cell includes: an electrode assembly, a can to receive the electrode assembly; and a cap assembly attached to an opening of the can. The cap assembly includes: a cap plate attached to the opening of the can; an electrode terminal extending through a through-hole in the cap plate; a gasket placed on the outer surface of the electrode terminal, to insulate the cap plate; an insulation plate positioned under the cap plate; and a terminal plate positioned under the insulation plate, so as to allow electricity flow through the electrode terminal.

The protection circuit board includes a protection circuit, which protects the battery from getting overcharged and overdischarged during charging/discharging operations. The protection circuit board can be electrically connected with electrodes of the bare cell, through a lead plate.

The molded resin part is formed by filling a hot-melt resin into a space between the cap plate and the protection circuit board and then allowing the resin to harden. The molded resin part prevents battery components from moving between the cap plate and the protection circuit board.

The molded resin part may be attached to the lead plate placed between the cap plate and the protection circuit board. However, since the cap plate becomes narrower as the size of the battery is reduced, the lead plate is welded to an upper surface of the cap plate in one line. A detachment of the molded resin part from the cap assembly, as a result of external forces, such as, twisting or bending of the battery, cannot be prevented by only the lead plate.

Conventionally, a holder has been additionally positioned on the upper surface of the cap plate, in order to strengthen the attachment between the cap plate and the molded resin part. The holder prevents the relative motion of the molded resin part and the cap plate, or prevents the molded resin part from being separated from the cap plate.

However, since such a holder is positioned on the upper surface of the cap plate, additional processes are required for manufacturing such a secondary battery, thereby increasing the associated manufacturing costs and time. In addition, an additional space is required for positioning the holder on the upper surface of the cap plate, thereby causing a limitation in the space utilization in the battery. Further, total height of the battery is increased, thereby causing a decrease in battery capacity, or an increase in the size of the battery.

SUMMARY OF THE INVENTION

Aspects of the present invention provide a secondary battery, which can improve an attachment between a molded resin part and a cap assembly in a battery pack, without using an additional component, such as a holder.

According to aspects of the present invention, there is provided a secondary battery which comprises: a bare cell including an electrode assembly, a can to receive the electrode assembly, and a cap assembly attached to an opening of the can; a protection circuit board electrically connected to electrode terminals of the bare cell; and a molded resin part that is disposed in a space between the bare cell and the protection circuit board. The cap assembly comprises a cap plate attached to the opening of the can, and an electrode terminal penetrating a through hole of the cap plate. The electrode terminal is electrically insulated from the cap plate by a gasket, and a gap is formed between the electrode terminal and/or the gasket, and an upper surface of the cap plate. A part of the molded resin part is inserted into the gap.

According to aspects of the present invention, the electrode terminal may include a pin part extending through the through-hole of the cap plate, and a head part having a rectangular shape, with at least one side thereof being larger than a diameter of the pin part, and being formed as one body with the pin part.

According to aspects of the present invention, the gasket may include a head-supporting part to support the head part of the electrode terminal, and a pin-covering part to cover the pin part.

According to aspects of the present invention, the head-supporting part of the gasket completely supports the head part of the electrode terminal, and the gap may be formed between a lower surface of the head-supporting part and the upper surface of the cap plate.

According to aspects of the present invention, the head-supporting part supports a portion of the head part, and the gap may be a space that is formed between a lower surface of the head part and the upper surface of the cap plate.

According to aspects of the present invention, an attaching groove may be formed on the upper surface of the cap plate, to at least partially define the gap.

According to aspects of the present invention, the attaching groove may be formed on the upper surface of the cap plate, corresponding to a narrow side of the head part. Attaching grooves may be formed at both sides of the cap plate, with the electrode terminal disposed therebetween.

According to aspects of the present invention, the attaching grooves may be symmetrical to each other, with respect to the electrode terminal.

According to aspects of the present invention, the cap assembly further includes a terminal plate placed under the cap plate, to electrically connect the electrode terminal to the electrode assembly, and an insulation plate having a rotation-preventing groove, placed between the cap plate and the terminal plate. A protrusion part protrudes downward from a lower part of the cap plate, on which one of the attaching grooves is formed, and may be inserted into the rotation-preventing groove formed on the insulation plate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
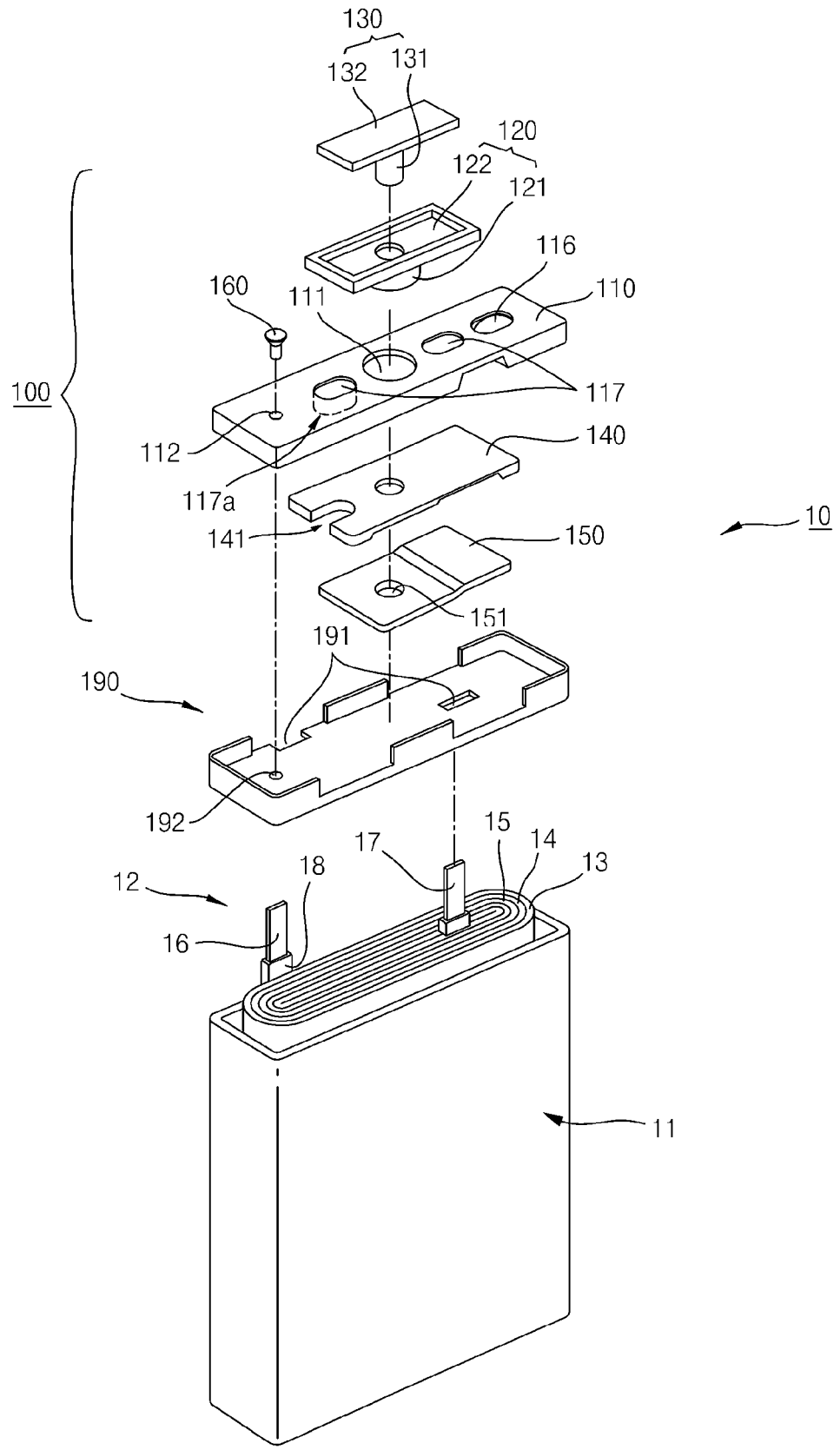
FIG. 1 is an exploded perspective view illustrating a bare cell of a secondary battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures. As referred to herein, "upper" and "lower" are used for convenience to refer to parts of various components, as the components are shown in the figures, and are not intended to be limiting to any particular orientation. In addition, when a first component is said to be "disposed on" a second component, the first element can directly contact the second element, or intervening elements can be therebetween.

FIG. 1 is an exploded perspective view illustrating a bare cell 10 of a secondary battery, according to an exemplary embodiment of the present invention. Referring to FIG. 1, the bare cell 10 comprises an electrode assembly 12, a can 11 to receive the electrode assembly 12, and a cap assembly 100 attached to an opening at the top of the can 11.

The electrode assembly 12 includes a cathode electrode 13, an anode electrode 15, and a separator 14 disposed therebetween. The electrode assembly 12 can be wound into a flat shape, in order to increase an electrical capacity. A cathode tab 16 and an anode tab 17 respectively extend from the two electrodes 15 and 13. An insulation tape 18 is wound around the cathode and anode tabs 16 and 17, in order to prevent an electrical short between the electrodes 13 and 15.

The can 11 is a rectangular, parallelepiped container made of a metal, and can be formed by a deep drawing process. The can 11 can be a terminal of the secondary battery. The can 11 serves as a container that receives the electrode assembly 12 and an electrolyte. The opening of the top of the can 11, through which the electrode assembly 12 is placed, is sealed by a cap assembly 100.

The cap assembly 100 includes: a cap plate 110 having a through-hole 111; a gasket 120 disposed in the through-hole 111; an electrode terminal 130 extending through the through-hole 111 and insulated from the cap plate by the gasket 120; an insulation plate 140 positioned under the cap plate 110; and a terminal plate 150 positioned under the insulation plate 140 and electrically connected to the electrode terminal 130. An insulation case 190 having electrode through holes 191 and 192 may be positioned under the terminal plate 150, in order to prevent an electrical short between the terminal plate 150 and the electrode assembly 12. An attaching groove 117 is formed on an upper surface of the cap plate 110 and is filled with a molded resin, which forms a molded resin part (not shown), so as to strengthen an attachment between the bare cell 10 and the mold resin part.

The anode 15, of the electrode assembly 12, is electrically connected with the electrode terminal 130, by the anode tab 17 and the terminal plate 150. The cathode 13 is electrically connected with the cap plate 110, by the cathode tab 16. The polarities of the various components may be reversed without departing from the scope of the present teachings.

An electrolyte inlet 112 is formed in the cap plate 110, through which an electrolyte can be injected into the can 11. The electrolyte inlet 112 is sealed by a sealing part 160, after the electrolyte is injected.

A vent 116 is formed in the cap plate 110. The vent 116 is thinner than other parts of the cap plate 110, and when the inner pressure of the battery is increased, from gas generated electrochemical reactions, the vent 116 ruptures to release the gas.

Figure 4:
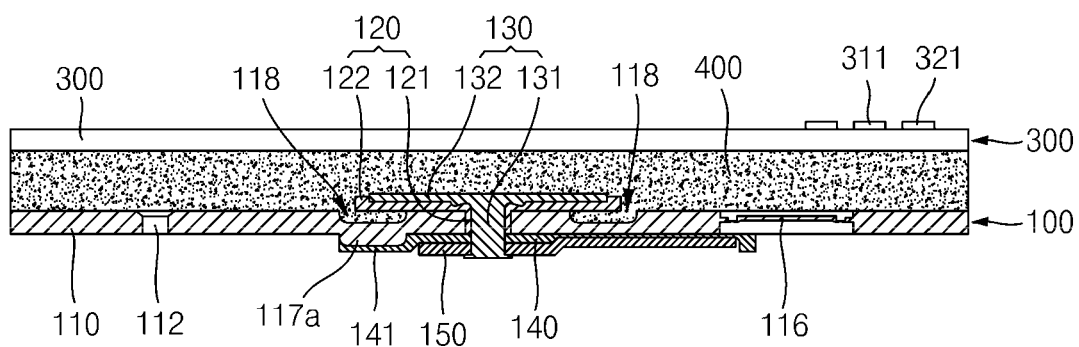
FIGS. 4 and 5 are schematic cross-sectional views illustrating tops of secondary batteries, according to exemplary embodiments of the present invention.

Referring to FIG. 4, the secondary battery comprises the bare cell 10, a protection circuit board 300 electrically connected to the electrodes 16 and 17 of the bare cell 10, and a molded resin part 400. The molded resin part 400 is disposed between the bare cell 10 and the protection circuit board 300. The protection circuit board 300 is a protection circuit disposed on a panel made of a resin. The protection circuit protects the battery from being overcharged and over-discharged and is electrically connected to connection terminals (not shown).

The connection terminals are electrically connected with external input/output terminals 311 and 321, and can be attached to external electric equipment. One connection terminal of the protection circuit board 300 is electrically connected with the cap plate 110, through a lead plate, and may have positive polarity. The other connection terminal is electrically connected with the electrode terminal 130, through a thermal breaker, a lead plate, a PTC element, and the like (not shown) and may have negative polarity.

The molded resin part 400 is formed by filling a hot-melt resin into a space between the cap plate 110 and the protection circuit board 300, which then solidifies. The molded resin part 400 prevents battery components from moving between the cap plate 110 and the protection circuit board 300.

Figure 2:
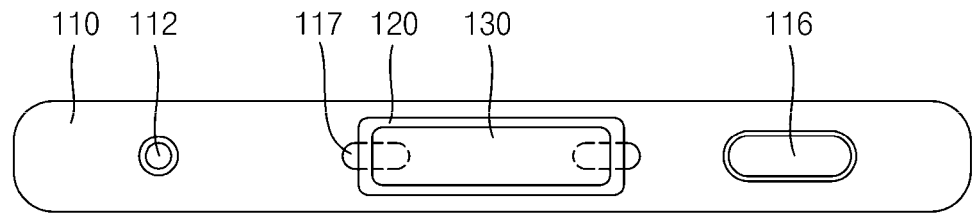
FIG. 2 is a top-plan view illustrating a cap assembly of the bare cell of FIG. 1.
Figure 3:
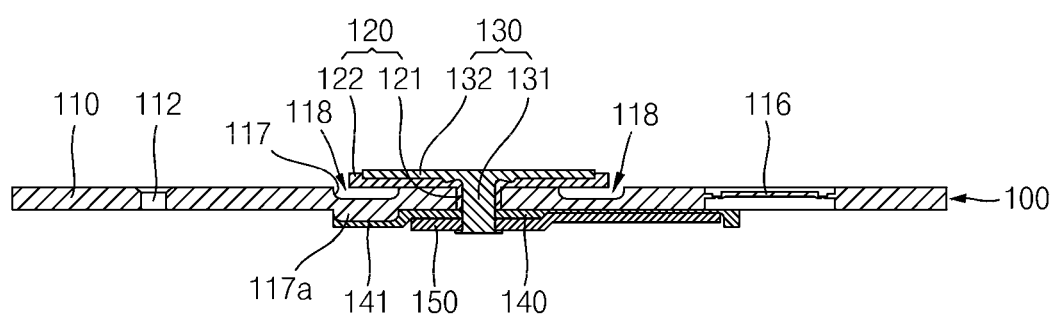
FIG. 3 is a cross-sectional view illustrating the cap assembly of FIG. 2.

Referring to FIGS. 2-4, the secondary battery, according to an exemplary embodiment of the present invention, strengthens an attachment between the molded resin part 400 and the cap assembly 100 of the bare cell 10. The molded resin part 400 extends into a gap 118 between the gasket 120 and the upper surface of the cap plate 110.

The electrode terminal 130 includes: a pin part 131 that extends through the through-hole 111 of the cap plate 110; and a head part 132 attached to the pin part 131, which has a rectangular shape. The heat part 132 has at least one side that is longer than the diameter of the pin part 131.

The gasket 120 includes a head-supporting part 122, to support the head part 132, and a pin-covering part 121, to cover a portion of the pin part 131. The head-supporting part 122 can contact an entire lower surface of the head part 132. The gap 118 is formed between a lower surface of the head-supporting part 122 and an upper surface of the cap plate 110.

The gap 118 is partially defined by an attaching groove 117 formed on the upper surface of the cap plate 110. The attaching groove 117 is disposed adjacent to the perimeter of the gasket. In order words, the attaching groove 117 is formed on the upper surface of the cap plate 110, adjacent to a narrow side of the head part 132, when viewed from above. The attachment between the molded resin part 400 and the cap assembly 100 is strengthened, because the molded resin part extends into the gap 118, as shown in FIG. 4. Accordingly, the attachment therebetween can be improved without the need for an additional component, such as a holder, or the like.

Two attaching grooves 117, as shown in FIG. 2, can be formed in the cap plate 100, adjacent to opposing sides of the electrode terminal 130, but the present teachings are not limited to such a configuration. For instance, the attaching groove 117 may be formed lengthwise, or into a closed curve, along a part of the cap plate 110 adjacent to the perimeter of either the electrode terminal 130 or the gasket 120.

According to various embodiments, the attaching grooves 117 may be symmetrically disposed with respect to each other, around the electrode terminal 130. If the electrode terminal 130 is placed in the middle of the cap plate 110, and the attaching grooves 117 are formed symmetrically to each other on opposing sides of the electrode terminal 130, the molded resin part 400 is also disposed in the attaching grooves 117 in a symmetrical shape, so as to protect against twisting or bending of the battery.

Referring to FIGS. 3 and 4, a protrusion part 117a extends downwardly from a lower surface of the cap plate 110 below the attaching groove 117. The protrusion part 117a can be inserted into a rotation-preventing groove 141, formed in the insulation plate 140. The cap assembly 100 is assembled by inserting the electrode terminal 130 into the through-hole 111 and into holes 142, 151 formed in the insulation plate 140 and the terminal plate 150, respectively. A spinning process is performed to rotary-compress the bottom end of the electrode terminal 130.

If the insulation plate 140 and/or the terminal plate 150 are rotated together with the electrode terminal 130, during the spinning process, there may be a short circuit between the terminal plate 150 and the cap plate 110. The protrusion part 117a and the rotation-preventing groove 141 are attached to each other, so as to suppress the rotation of the insulation plate 140, thereby preventing the electrical short.

Figure 5:
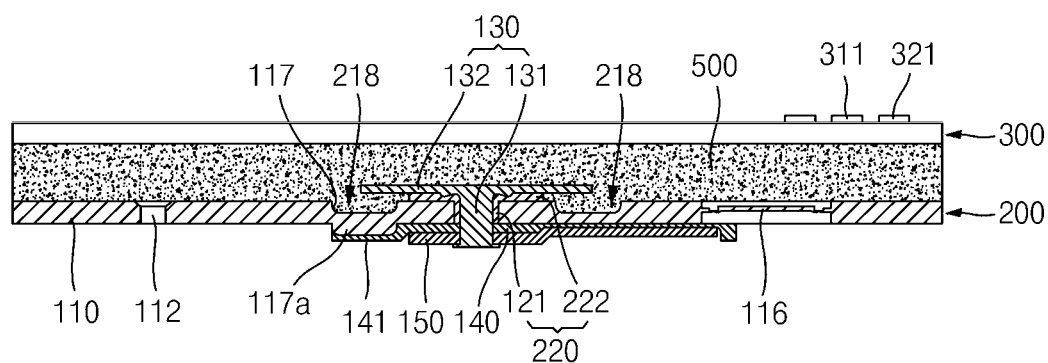

FIG. 5 is a schematic cross-sectional view illustrating the top of a secondary battery, according to another exemplary embodiment of the present invention. Only the differences with the above-described embodiments will be described hereinafter. Referring to FIG. 5, a portion of a molded resin part 500 is inserted into a gap 218, between of the electrode terminal 130 and an upper surface of the cap plate 110, so as to strengthen an attachment between the molded resin part 400 and a cap assembly 200.

The electrode terminal 130 includes a pin part 131, which extends through the terminal-through hole 111 of the cap plate 110, and a head part 132 attached to the pin part 131. The head part 132 has a square shape and a perimeter larger than that of the pin part 131. A gasket 220 includes a head-supporting part 222 to support the head part 132, and a pin-covering part 121 to cover a portion of the pin part 131. The gap 218 is formed between a lower part of the head part 132 and the upper part of the cap plate 110.

The gap 218 is formed between the flat lower surface of the head part 132 and the upper surface of the cap plate 110, to enable the head-supporting part 222 to support a part of the head part 132. In this case, even without an attaching groove 117 on the cap plate 110, a part of the molded resin part 500 is inserted into the gap 218 between a lower part of the head part 132, which is not supported by the head-supporting part 222, and the cap plate 110, so that the attachment of the molded resin part 400 and the cap assembly 200 can be strengthened.

However, as shown in FIG. 5, if the attaching groove 117 is formed in the upper surface of the cap plate 110 adjacent to the gap 218, the gap 218 becomes larger. Thus the quantity of the molded resin part 500 inserted therein is increased, so that the attachment of the molded resin part 500 and the cap assembly 200 becomes stronger. Accordingly, the attachment between the molded resin part 500 and the cap assembly 200 can be improved, without an additional component.

To improve the attachment of the molded resin part 500 to the cap assembly 200, the protrusion part not shown, or a holder (not shown), may be formed to extend upward from the upper surface of the cap plate 110. The protrusion part and holder are attached to the molded resin part 500, so as to resist external forces, such as, twisting and bending of the battery. When viewed from above, the protrusion part may have a rectangular shape. The holder is attached to the protrusion. The holder has, in the middle of a lower surface thereof, a groove corresponding to the protrusion part. The protrusion part is inserted into the groove of the holder. Accordingly, when the holder is inserted into the protrusion part 1774, the protrusion part is hardly separated from the holder, even if a lateral force is applied thereto.

As described above, a secondary battery, according to aspects of the present invention, produces the following effects. The attachment of a molded resin part and a cap assembly in a battery pack, can be improved, without using additional components. Accordingly, the manufacturing costs and time of the battery can be decreased, the space efficiency is improved, the battery capacity is increased, and/or the battery size is reduced, by decreasing the total height of the battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A secondary battery, comprising:
  a bare cell comprising an electrode assembly, a can to receive the electrode assembly, and a cap assembly attached to an opening of the can;
  a protection circuit board electrically connected to the bare cell; and
  a molded resin part disposed between the bare cell and the protection circuit board, wherein the cap assembly comprises:
    a cap plate attached to the opening of the can and having a through-hole formed therein;
    an electrode terminal extending through the through-hole and comprising pin part extending through the through-hole of the cap plate; and a head part attached to the pin part, having a rectangular shape, and having at least one side that is wider than a diameter of the pin part; and
    a gasket insulating the electrode terminal from the cap plate and comprising a head-supporting part contacting an entire lower surface of the head part,
  wherein a gap is disposed between the electrode terminal and an upper surface of the cap plate, and a portion of the molded resin part is disposed in the gap, wherein the gap is formed between a lower surface of the head-supporting part and the upper surface of the cap plate, wherein the cap plate comprises a first attaching groove that at least partially defines the gap, wherein the first attaching groove has an overlapping region which overlaps with a portion of the electrode terminal, wherein the portion of molded resin part is disposed in the overlapping region, and wherein the first attaching groove is spaced away from the through-hole.

2. The secondary battery of claim 1, wherein the cap plate comprises the first attaching groove that at least partially defines the gap, disposed adjacent to a narrow side of the head part.

3. The secondary battery of claim 1, wherein the cap plate further comprises a second attaching groove, and the first and second attaching grooves are formed on opposing sides of the cap plate, adjacent to opposing sides of the through-hole.

4. The secondary battery of claim 3, wherein the first and second attaching grooves are symmetrically disposed on the cap plate with respect to the electrode terminal.

5. The secondary battery of claim 3, wherein the cap assembly further comprises:

a terminal plate disposed on a lower surface of the cap plate, to electrically connect the cap plate to the electrode terminal to the electrode assembly; and an insulation plate disposed between the terminal plate and the cap plate, to electrically insulate the terminal plate from the cap plate, the insulation plate comprising a first rotation-preventing groove, wherein the cap plate further comprises a first protrusion part disposed adjacent to the first attaching groove, extending from the lower surface of the cap plate into the first rotation-preventing groove, to prevent a rotation of the cap plate.

6. The secondary battery of claim 5, wherein:

the insulation plate further comprises a second rotation-preventing groove; and the cap plate further comprises a second protrusion part disposed adjacent to the first attaching groove, extending from the lower surface of the cap plate into the second rotation-preventing groove.

7. The secondary battery of claim 1, wherein the molded resin part prevents the cap plate from contacting the electrode terminal.

8. The secondary battery of claim 1, further comprising an insulation case disposed adjacent to a lower surface of the cap plate.

9. A secondary battery, comprising:

a bare cell comprising an electrode assembly, a can to receive the electrode assembly, and a cap assembly attached to an opening of the can;

a protection circuit board electrically connected to the bare cell; and a molded resin part disposed between the bare cell and the protection circuit board, wherein the cap assembly comprises:

a cap plate attached to the opening of the can and having a through-hole formed therein;

an electrode terminal extending through the through-hole and comprising a pin part extending through the through-hole of the cap plate; and a head part attached to the pin part, having a rectangular shape, and having at least one side that is wider than a diameter of the pin part; and a gasket insulating the electrode terminal from the cap plate and comprising a head-supporting part supporting a portion of the head part, wherein a gap is disposed between the electrode terminal and an upper surface of the cap plate, and a portion of the molded resin part is disposed in the gap, wherein the gap is formed between a lower surface of the head part and the upper surface of the cap plate, wherein the cap plate comprises a first attaching groove that at least partially defines the gap, wherein the first attaching groove has an overlapping region which overlaps with a portion of the electrode terminal, wherein the portion of molded resin part is disposed in the overlapping region, and wherein the first attaching groove is spaced away from the through-hole.

10. The secondary battery of claim 9, wherein the cap plate comprises the first attaching groove that at least partially defines the gap, disposed adjacent to a narrow side of the head part.

11. The secondary battery of claim 9, wherein the cap plate further comprises a second attaching groove, and the first and second attaching grooves are formed on opposing sides of the cap plate, adjacent to opposing sides of the through-hole.

12. The secondary battery of claim 11, wherein the first and second attaching grooves are symmetrically disposed on the cap plate with respect to the electrode terminal.

13. The secondary battery of claim 11, wherein the cap assembly further comprises:

a terminal plate disposed on a lower surface of the cap plate, to electrically connect the cap plate to the electrode terminal to the electrode assembly; and an insulation plate disposed between the terminal plate and the cap plate, to electrically insulate the terminal plate from the cap plate, the insulation plate comprising a first rotation-preventing groove, wherein the cap plate further comprises a first protrusion part disposed adjacent to the first attaching groove, extending from the lower surface of the cap plate into the first rotation-preventing groove, to prevent a rotation of the cap plate.

14. The secondary battery of claim 13, wherein:

the insulation plate further comprises a second rotation-preventing groove; and the cap plate further comprises a second protrusion part disposed adjacent to the first attaching groove, extending from the lower surface of the cap plate into the second rotation-preventing groove.

15. The secondary battery of claim 9, wherein the molded resin part prevents the cap plate from contacting the electrode terminal.

16. The secondary battery of claim 9, further comprising an insulation case disposed adjacent to a lower surface of the cap plate.

* * * * *